United States Patent
Gadsby

(10) Patent No.: US 6,343,069 B1
(45) Date of Patent: Jan. 29, 2002

(54) APPARATUS AND METHOD FOR AUTOMATIC AND ADAPTIVE ADJUSTMENT OF BUILD-OUT CAPACITANCE TO BALANCE A HYBRID

(75) Inventor: Winston M. Gadsby, Herndon, VA (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 08/923,290

(22) Filed: Sep. 4, 1997

(51) Int. Cl.[7] .............................................. H04M 1/76
(52) U.S. Cl. ...................................... 370/252; 370/276
(58) Field of Search ................................ 370/276, 282, 370/284, 285, 525, 252

(56) References Cited

U.S. PATENT DOCUMENTS

| | | | |
|---|---|---|---|
| 3,848,098 A | * 11/1974 | Pinel | |
| 4,001,826 A | * 1/1977 | Moulton | 342/110 |
| 4,275,276 A | * 6/1981 | Rizzo | |
| 4,368,361 A | * 1/1983 | Chung et al. | 179/170.2 |
| 4,607,140 A | * 8/1986 | Schorr | |
| 5,249,225 A | * 9/1993 | Williams | 379/404 |
| 5,852,415 A | * 12/1998 | Cotter | 341/120 |
| 5,905,398 A | * 5/1999 | Todsen et al. | 327/337 |
| 5,963,638 A | * 10/1999 | Sheets | |

OTHER PUBLICATIONS

*Pulse Communications, Inc., "D4 Carrier System 2FXO–361 and 2FXO–362 Advanced 2–Wire FXO Channel Units", Apr., 1997, pp. 1–23.

*Pulse Communications, Inc., Planning Letter for "Advanced D4 2FXO Family", 1996.

Pulse Communications, Inc., "D4 Carrier System 2FX0–2L3 2–Wire FXO Channel Unit", Jul. 1996, pp. 1–20.

XEL Communications, Inc., "8242–AAO Auto Aligning 2–Wire Dial Pulse Terminating/Foreign Exchange Office with Gain Transfer Channel Unit, 2W DPT/FXO/GT D4 and SLC–96® COT Channel Banks (PCM)," Jan. 17, 1996, pp. 1–16.

Pulse Communications, Inc., "PSC Series 5 Carrier System AUA 158i Dual Single–Party Pots Channel Unit Remote Terminal", Jun., 1995, pp. 1–10.

Midcom Publication entitled "Dual Transformer Hybrids", 1 page, published prior to the Sep. 4, 1997 U.S. filing date of the present application.

Midcom Publication entitled "Single Transformer Hybrids", 2 pages, published prior to the Sep. 4, 1997 U.S filing date of the present application.

* cited by examiner

Primary Examiner—Douglas Olms
Assistant Examiner—Ken Vanderpuye
(74) Attorney, Agent, or Firm—Jerry M. Presson; Joseph J. Buczynski

(57) ABSTRACT

An apparatus and method for automatically selecting an amount of build-out capacitance to be applied to a hybrid in a telecommunications circuit to balance or substantially balance the hybrid. The apparatus measures voltages of signals being transmitted on telecommunication lines to which the hybrid is coupled, and based on the measured voltages, automatically selects any number of a plurality of capacitive elements to be coupled to the balance port of the hybrid as the build-out capacitance. The apparatus is further controllable to operate in a manual mode in which the capacitive elements to be coupled to the hybrid are manually selected by switches.

38 Claims, 8 Drawing Sheets

APPARATUS AND METHOD FOR AUTOMATIC AND ADAPTIVE ADJUSTMENT OF BUILD-OUT CAPACITANCE TO BALANCE A HYBRID

FIELD OF THE INVENTION

The present invention relates to an apparatus and method for automatically selecting an amount of build-out capacitance to be applied to a hybrid in a telecommunications circuit to balance or substantially balance the hybrid. More particularly, the present invention relates to an apparatus and method for measuring the voltages of signals being transmitted on telecommunication lines to which the hybrid is coupled, and based on the measured values, automatically selecting any number of capacitive elements to be coupled to the balance port of the hybrid as the build-out capacitance.

DESCRIPTION OF THE RELATED ART

In the field of telecommunications, it is common to use a hybrid function as an interface between the external tip and ring lines of a "plain old telephone service" (POTS) line and any other signal processing circuitry within a unit. That is, the tip and ring lines of the POTS line are capable of handling two-way signal transmission. However, most processing circuitry requires the transmission to be split into one-way paths before the signals can be processed. Such an interface is commonly used in telephones, modems, and so on, to couple traffic coming out of the device into the POTS line (receive as viewed from the POTS line), and traffic from the POTS line (transmit as viewed from the POTS line) into the device.

A hybrid can be a single-transformer type, as shown in FIG. 1, or a dual-transformer type, as shown in FIG. 2. In a telecommunications system using either a single-transformer hybrid or a dual-transformer hybrid, the hybrid couples the tip and ring lines of the POTS line (identified as the "2-$W_{Line}$" in FIGS. 1 and 2) to a pair of transmit lines ("$N_{Tx}$" in FIG. 1 and "4-$W_{Tx}$" in FIG. 2) and a pair of receive lines ("$N_{Rx}$" in FIG. 1 and "4-$W_{Rx}$" in FIG. 2), which can be coupled to the transmit and receive ports, respectively, of a telephone, modem, private branch exchange unit (PBX), or the like. For example, the two transmit lines can be coupled to a microphone or transmitter of the telephone, while the two receive lines can be coupled to a speaker or earphone of the telephone. The signal being transmitted by the microphone will appear between the two transmit lines, while the signal being received by the speaker will appear between the two receive lines.

In other words, the signal being transmitted on the transmit lines is represented by the difference in potential between the two transmit lines, while the signal being received on the receive lines is represented by the difference in potential between the two receive lines. Of course, one of the receive lines and one of the transmit lines could be coupled in common to ground. This is generally done in the single-transformer type by grounding the external connection on $Z_{o\ BAL}$. In the dual-transformer type, one side of each port is connected to ground to accomplish the same.

The hybrid converts a signal being transmitted on the two transmit lines so that it is transmitted between the tip and ring lines of the POTS line, while the hybrid also converts a signal being received on the tip and ring lines of the POTS line into a signal that is received over the two receive lines. It is again noted that the signals being received and transmitted can appear simultaneously on the tip and ring lines of the POTS line.

When employing a hybrid in the manner described above, it is important that the signal being transmitted over the two transmit lines is essentially isolated from the signal being received over the two received lines, and vice-versa, so that minimal electrical coupling between the paths occurs. Preferably, none of the signal being transmitted over the two transmit lines should appear on the receive lines, and likewise, none of the signal being received on the two receive lines should appear on the two transmit lines.

The degree to which the signals on the transmit and receive lines are isolated from each other is dependent on the trans-hybrid loss of the hybrid. If the trans-hybrid loss of the hybrid is low, some of the signal being transmitted over the transmit lines may appear on the receive lines and vice versa. However, if the hybrid has a very high trans-hybrid loss, the transmit and receive lines will be essentially isolated from each other so that their respective signals do not appear on each other's lines.

The amount of trans-hybrid loss of the hybrid is affected by the impedance characteristics of the tip and ring lines of the POTS line. In particular, the amount of trans-hybrid loss of the hybrid is influenced by the amount of capacitance that is present at the interface of the hybrid and the tip and ring lines. The amount of capacitance between and the amount of resistance of the tip and ring lines depends on the length of the tip and ring lines, as well as the gauge of wire that is used for those lines. In standard practice, telephone companies use twisted pair cables having about 0.083 $\mu$F of capacitance per mile, regardless of gauge.

The capacitance appearing at the interface of the hybrid and the tip and ring lines will tend to place the hybrid "out of balance", which reduces the amount of trans-hybrid loss in the hybrid and thus allows coupling to occur between the transmit and receive lines. However, that capacitance can be compensated for to "balance" the hybrid by adding additional capacitance to a balance port of the hybrid, which is usually configured as a tap on one of the coils of the transformer or transformers in the hybrid.

For example, a circuit card developed by Pulse Communications, Inc., which functions as an interface circuit to a central office switch (e.g., a switching unit to which telephones are connected), includes a hybrid for coupling the tip and ring lines of a POTS line to transmission and receive lines in the manner described above. This circuit card includes a plurality of capacitors, which are each coupled to a manual switching device that enables the capacitors to be selectively coupled to the balance port of the hybrid.

Specifically, the circuit card includes 2 nF, 4 nF, 8 nF, 16 nF, 32 nF and 64 nF capacitors, which are each coupled to the hybrid by a respective switch of the manual switching device. By opening or closing the switches as desired, a capacitance of 0–126 nF in 2 nF steps can be applied to the balance port of the hybrid. Accordingly, an appropriate amount of capacitance can be applied to the hybrid as a "build-out capacitance" to compensate for capacitance that is applied to the hybrid by the tip and ring lines. For instance, if the installer of the circuit card determines that 10 nF of build-out capacitance is sufficient to compensate for the capacitance that is applied to the hybrid by the tip and ring lines, the switches coupled to the 2 nF capacitor and 8 nF can be selected, so that a total of 10 nF of capacitance will be applied to the hybrid circuit.

This manual switching configuration of the circuit card described above has certain disadvantages. For example, when this type of circuit card is installed in an existing telephone system, a skilled technician must determine the capacitance applied to the hybrid by the tip and ring lines by using a trial-and-error measurement technique. He attempts to maximize trans-hybrid loss by guessing the best setting, activating the appropriate switches, measuring trans-hybrid loss, then adjusting his guess repeatedly. As he zeros in on the best setting, the trans-hybrid loss improves. This measuring and setting process is very time consuming. Therefore, if a large number of circuit cards are being installed, a technician may have to work for many days to complete the installation. Furthermore, error factors associated with the technician's equipment, the technician's abilities, and so on will influence the measurements and thus could result in an inaccurate amount of build-out capacitance being selected.

To overcome these disadvantages associated with a manually adjustable circuit card, Pulse Communications, Inc. has developed a circuit card, for use as an interface circuit, that is capable of automatically compensating for capacitance supplied to the hybrid by the tip and ring lines. This circuit card is also capable of automatically compensating for loss due to the resistance present in the telephony equipment, such as a telephone or switch connected to the circuit card.

This automatic type of circuit card includes, in particular, a digital signal processor coder/decoder (DSP CODEC) which is controlled by a microcontroller to balance the hybrid and provide an appropriate gain factor to the signals being transmitted and received in order to compensate for loss in the lines. The microcontroller accomplishes these functions by adjusting the feedback coefficients of the DSP CODEC to model a signal transmission and receive path which will compensate for the loss in the lines and balance the hybrid as best as possible. However, the microcontroller and DSP CODEC are complicated devices and therefore expensive.

Accordingly, a continuing need exists for a simple and inexpensive circuit that is capable of automatically applying an appropriate amount of build-out capacitance to a hybrid used in a telecommunication circuit to balance the hybrid and eliminate crosstalk between the transmission and receive lines coupled to the hybrid.

SUMMARY OF THE INVENTION

An object of the present invention is to provide a method and apparatus for automatically applying an appropriate build-out capacitance to a hybrid, used in a telecommunication circuit, to balance or substantially balance the hybrid so that the trans-hybrid loss is maximized and crosstalk between the transmission and receive lines coupled to the hybrid is minimized.

Another object of the invention is to provide a method and apparatus which is capable of determining a parameter of the tip and ring lines of a POTS line to which a hybrid is coupled, and based on that parameter, controlling a switching apparatus coupled to a plurality of capacitive elements having different capacitance values to apply an appropriate build-out capacitance to the hybrid circuit. The switching apparatus is further capable of being controlled manually independent of the determined parameter.

These and other objects of the present invention are achieved by providing an apparatus, adaptable for use with a hybrid that is employed in a telecommunications circuit, comprising a controller for controlling the status of a plurality of switches that are coupled to a plurality of capacitive elements having different capacitance values to selectively apply an appropriate combination of the capacitance elements as a build-out capacitance to the balance port of the hybrid. The controller is capable of automatically determining the appropriate amount of build-out capacitance to be applied to the balance port of the hybrid based on voltages measured on the tip and ring lines of the POTS line coupled to the hybrid during off-hook and on-hook states of the telecommunications circuit. The controller then reads from a memory an appropriate value for the build-out capacitance corresponding to the difference in these measured values, and controls the switches accordingly to couple the appropriate capacitive elements to the balance port of the hybrid.

The apparatus of the present invention is further capable of being switched to a manual mode in which the switches can be manually manipulated, independent of the controller, to couple the capacitive elements to the balance port of the hybrid in any desired combination.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, in which.

DETAILED DESCRIPTION OF THE PREFERRED EMBODIMENTS

Figure 3:
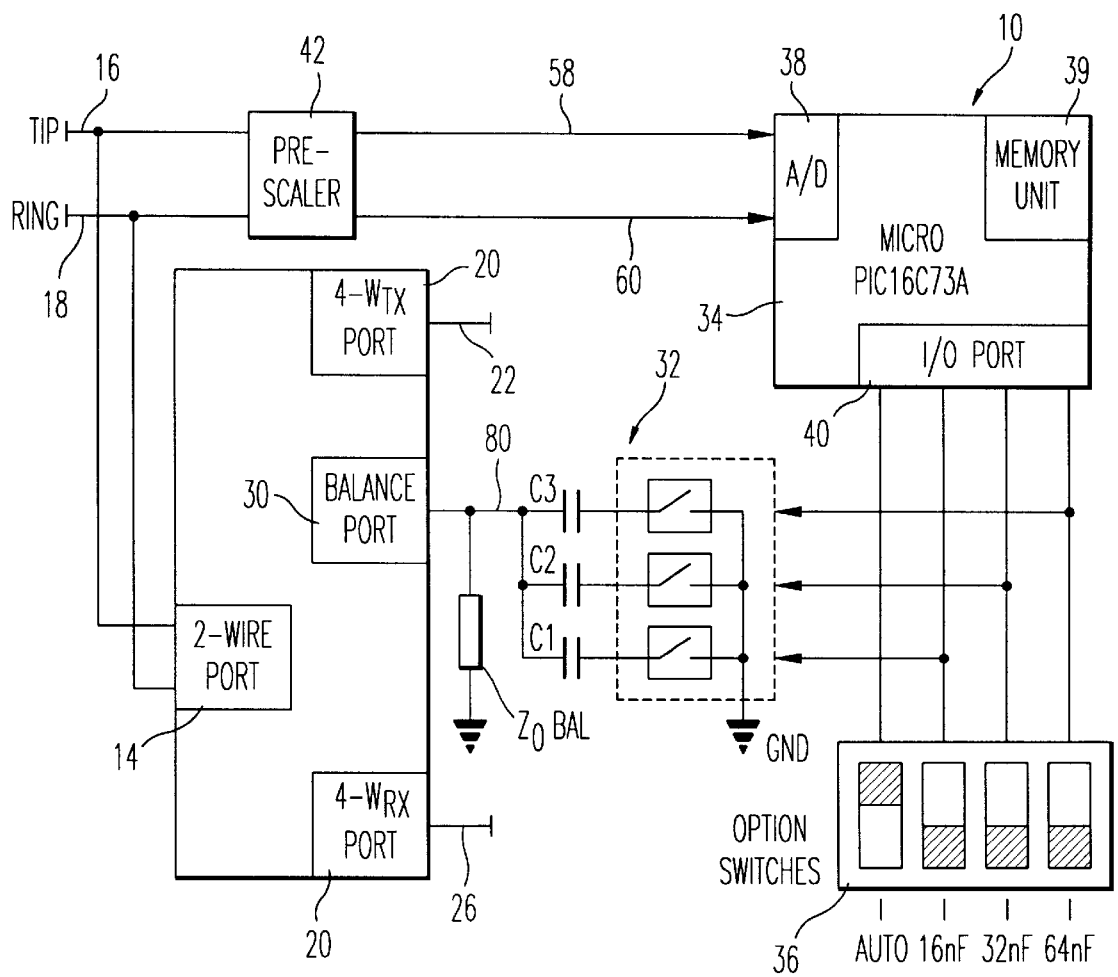
FIG. 3 is a block diagram illustrating an example of an apparatus for automatically applying build-out capacitance to a hybrid, such as those shown in FIGS. 1 and 2, in accordance with an embodiment of the present invention.

An embodiment of an apparatus 10 according to the present invention is shown in FIG. 3. Specifically, the apparatus includes a 2–4 wire hybrid 12 having a 2-wire port 14 to which is coupled the tip line 16 and ring line 18 of a central office (POTS) line. The hybrid 12 also includes a 4-wire port 20 having 2 transmit lines 22 and ground and 2 receive lines 26 and ground, which are adaptable to be coupled to a transmitter and receiver, respectively, of telephony equipment, such as a telephone, modem and the like. The hybrid 12 further includes a balance port 30 to which impedance $Z_{o\ BAL}$ is coupled, and to which a plurality of capacitive elements C1, C2 and C3 can be selectively coupled in the manner described below.

The apparatus 10 further includes a switching circuit 32 that is controlled automatically by a microprocessor 34, or manually by a plurality of option switches 36. Specifically, the switch 32 is controlled to couple any combination of capacitive elements C1, C2 and C3 to the balance port 30 of the hybrid 12.

The microprocessor 34 includes an analog-to-digital port 38 and an input/output port 40. The analog-to-digital port 38 is coupled to a prescaler 42, which is further coupled to the tip line 16 and ring line 18 and operates to convert the level of the voltage between the tip and ring lines to a voltage level that can be handled by the microprocessor 34. The input/output port 40 of the microprocessor 34 is coupled to the option switches 36 and the switch 32.

The apparatus 10 further includes a memory unit 39, which can be part of the microprocessor as indicated. The memory unit 39 includes a read only memory (ROM) portion in which is stored instruction code that is readable by the microprocessor 34 to control the operation of the microprocessor 34. The memory unit 39 further includes a random access memory (RAM) portion to which data can be written by the microprocessor 34, and from which stored data can be read by the microprocessor 34. The ROM portion of the memory unit 39 further includes pre-stored data defining a plurality of build-out capacitance values as described below with respect to FIG. 9, which can be read by the microprocessor 34. The ROM and RAM memories can be any type of ROM and RAM memories known in the art.

Figure 1:
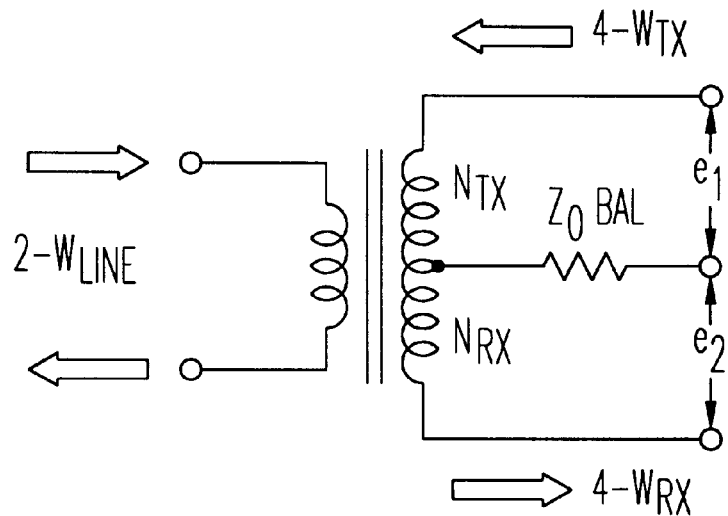
FIG. 1 is a circuit diagram illustrating an example of a single transformer 2–4 wire hybrid used in the field of telecommunications.

The components of the apparatus shown in FIG. 1 will now be described in more detail with reference to FIGS. 4–9.

Figure 4:
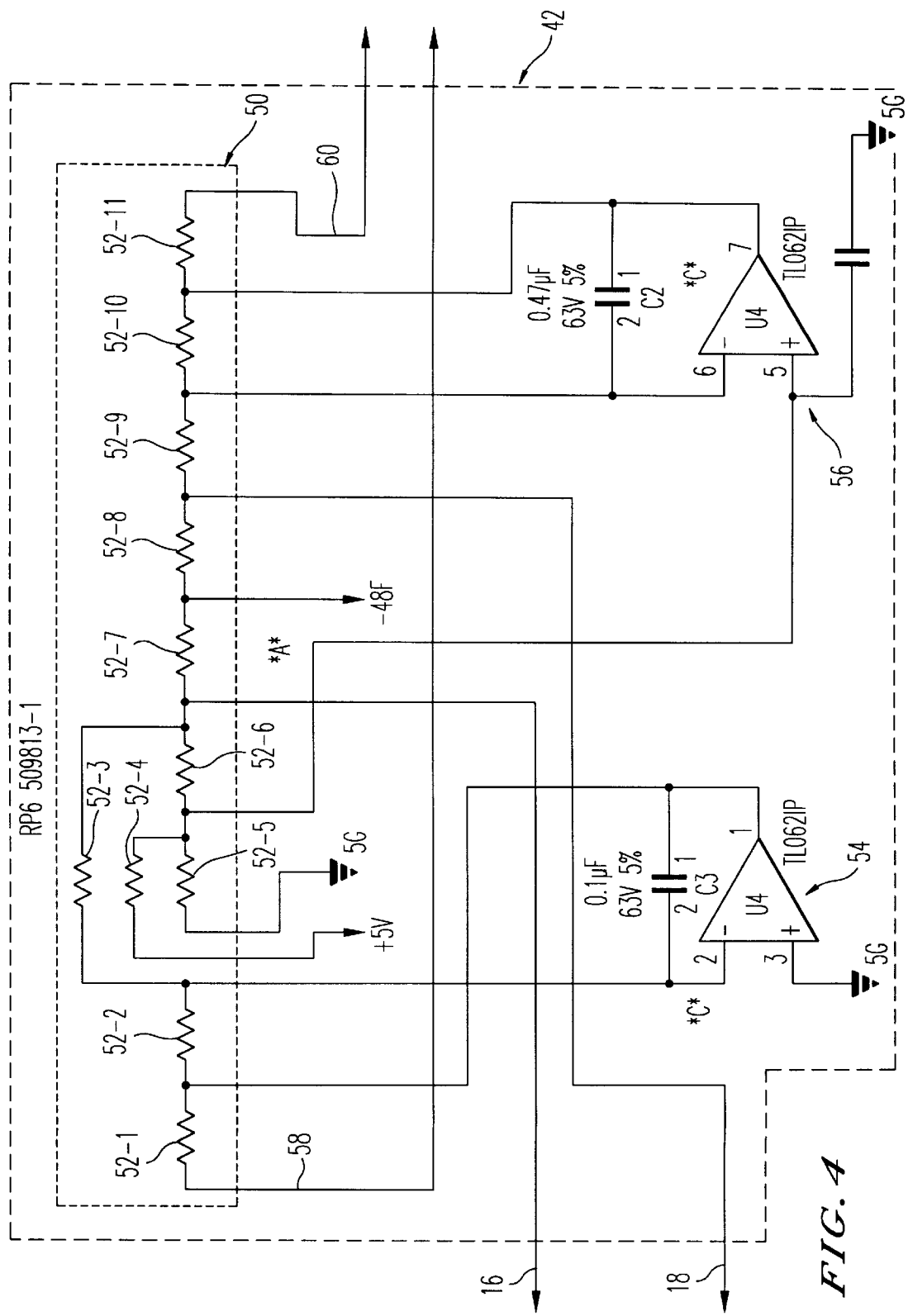
FIG. 4 is a circuit diagram illustrating an example of a prescaler used in the apparatus shown in FIG. 3.

The prescaler 42 is shown in more detail in FIG. 4. As illustrated, the prescaler 42 includes a resistor bank 50 comprising a plurality of resistors 52-1 through 52-11. The tip line 16 is coupled to a connection point between resistors 52-6 and 52-7, and the ring line 18 is coupled to the connection point between resistors 52-8 and 52-9. The resistor bank 50 can include any number of resistors, and the tip and ring lines can be coupled to a connection point between any of the resistors, as would be readily appreciated by one skilled in the art.

The prescaler further includes amplifier circuits 54 and 56 which, in conjunction with the resistors in the resistor bank 50, operate to convert the levels of the voltages on the tip line 16 and ring line 18 to levels that can be handled by the microprocessor 34. For instance, the voltage potential between the tip line 16 and ground, which is typically within the range of about 0 to about −50 volts, is converted by the prescaler 42 to be within a range of about 0 to about +5 volts. This converted 0 to +5 volt signal is output via line 58 to the microprocessor 34. In a similar manner, the voltage potential between the tip line 16 and ring line 18, which can be in the range of about −200 volts to about +100 volts, is converted by the prescaler to a 0 to +5 volt signal and appears on line 60 to the microprocessor 34.

Figure 2:
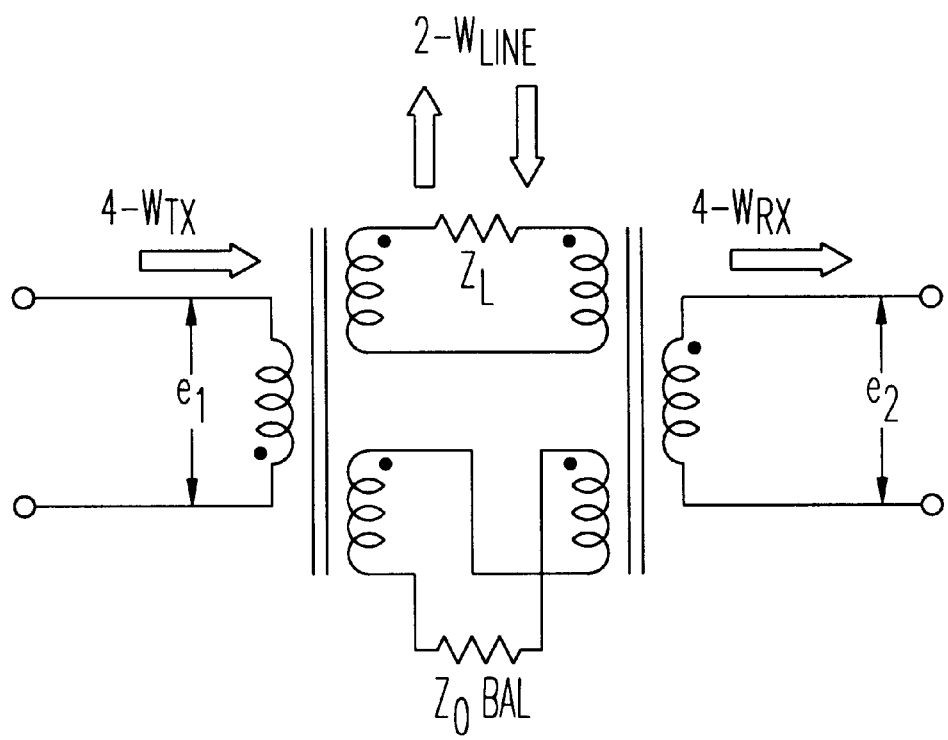
FIG. 2 is a circuit diagram illustrating an example of a dual transformer 2–4 wire hybrid used in the field of telecommunications.
Figure 5:
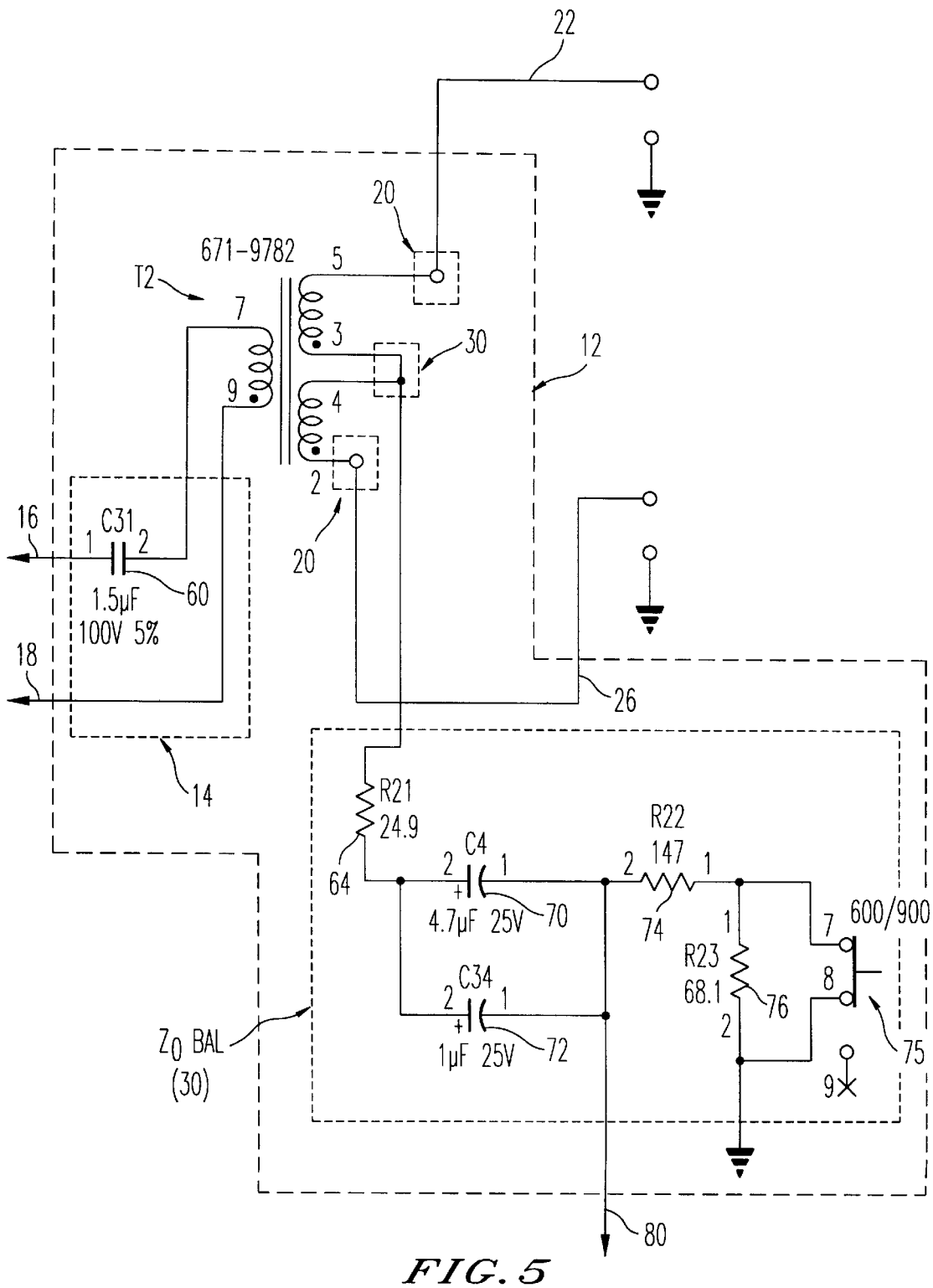
FIG. 5 is a circuit diagram illustrating an example of a dual transformer 2–4 wire hybrid employed in the apparatus shown in FIG. 3.

FIG. 5 illustrates the 2–4 wire hybrid 12 of the apparatus 10 shown in FIG. 3 in more detail. In this embodiment, the hybrid 12 is a single-transformer type hybrid T1. The hybrid 12 can instead be a dual transformer type hybrid, as shown in FIG. 2, as would readily be appreciated by one skilled in the art.

As indicated, the tip line 16 and ring line 18 are coupled to the 2-wire port 14 of the hybrid 12, and are thus coupled to the primary coil of transformer T1. Specifically, ring line 18 is coupled to one end of the primary coil of transformer T1, and the tip line 16 is coupled to the other end of the primary coil of transformer T1 via capacitor 60.

The secondary coils of transformer T1 are coupled to transmit line 22 and receive line 26, as shown. The transformer T1 converts the signals being transmitted or received on tip line 16 and ring line 18 into signals that are transmitted on transmit line 22 or received on receive line 26, as appropriate.

As further illustrated, the balance port 30, which is at terminals 3 and 4 of the secondary coils of transformer T1, is coupled to impedance $Z_{o\ BAL}$. Impedance $Z_{o\ BAL}$ includes a plurality of capacitors 70 and 72 which are coupled in parallel to each other and in series with resistors 64, 74 and 76 between the secondary coils of transformer T1 and ground. As further indicated, the connection point of capacitors 60 and 62 and resistor 66 is coupled to line 80 which, as shown in FIG. 1, is coupled to switch 32 via capacitive elements C1–C3. The impedance $Z_{o\ BAL}$ further includes a switch 75 which can be coupled to shunt resistor 76 to change the impedance of $Z_{0\ BAL}$ from 900 Ω to 600 Ω, depending on the environment in which the apparatus 10 is used and the impedance characteristic of the lines 16 and 18.

Figure 6:
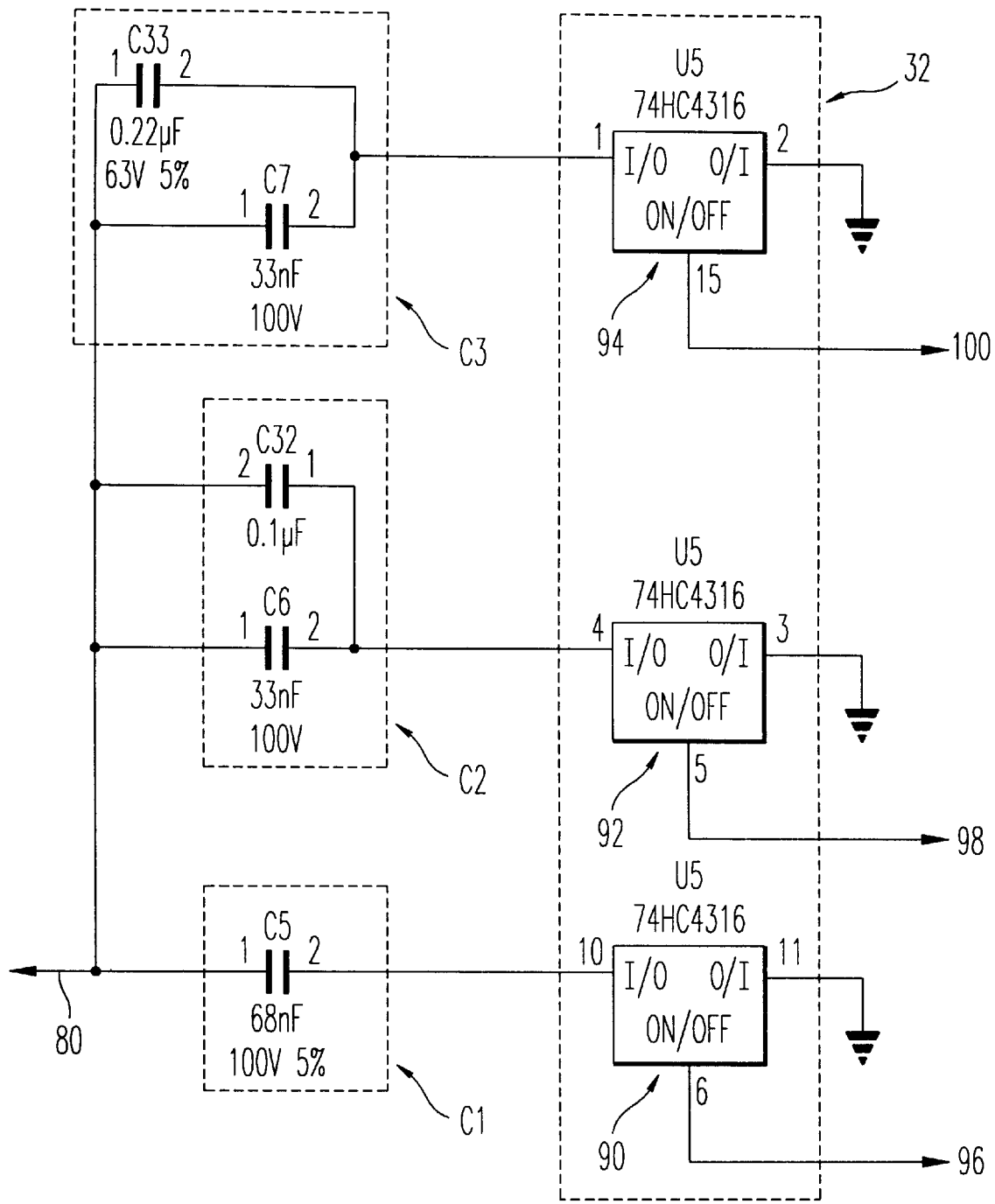
FIG. 6 is an example of capacitive elements and a switching device, employed in the apparatus shown in FIG. 3, for applying the capacitive elements to the 2–4 wire hybrid.

Switch 32 and capacitive elements C1–C3 are illustrated in more detail in FIG. 6. Specifically, switch 32 includes a plurality of switches 90, 92 and 94, which are controlled by the microprocessor 34 or the option switches 36 in the manner discussed in detail below. In this embodiment, capacitive element C1 is coupled between line 80 and switch 90, capacitive element C2 is coupled between line 80 and switch 92, and capacitive element C3 is coupled between line 80 and switch 94. In the preferred embodiment, capacitive element C1 includes a capacitor having a value of 68 nF. Capacitive element C2, on the other hand, includes a 33 nF capacitor and a 0.1 μF capacitor (100 nF capacitor) coupled in parallel to each other to provide a total capacitance of 133 nF. Capacitive element C3 includes a 33 nF capacitor coupled in parallel with a 0.22 μF (220 nF) capacitor, which provides a total capacitance of 253 nF. It is noted, however, that if a dual transformer hybrid is used as hybrid 12, the capacitance values of capacitive elements C1–C3 would be at or about 16 nF, 32 nF and 64 nF, respectively, or in other words, approximately one-fourth of the values of the capacitive elements for the dual transformer hybrid. Furthermore, the number of capacitive elements and switches is not limited to three, but can be any desired number. Also, the capacitive elements can have any values, and the values of the capacitive elements need not all be different as in the exemplary embodiment. Rather, all of the values can be the same or substantially the same, or some of the values can be equal to each other while other values are different.

Figure 7:
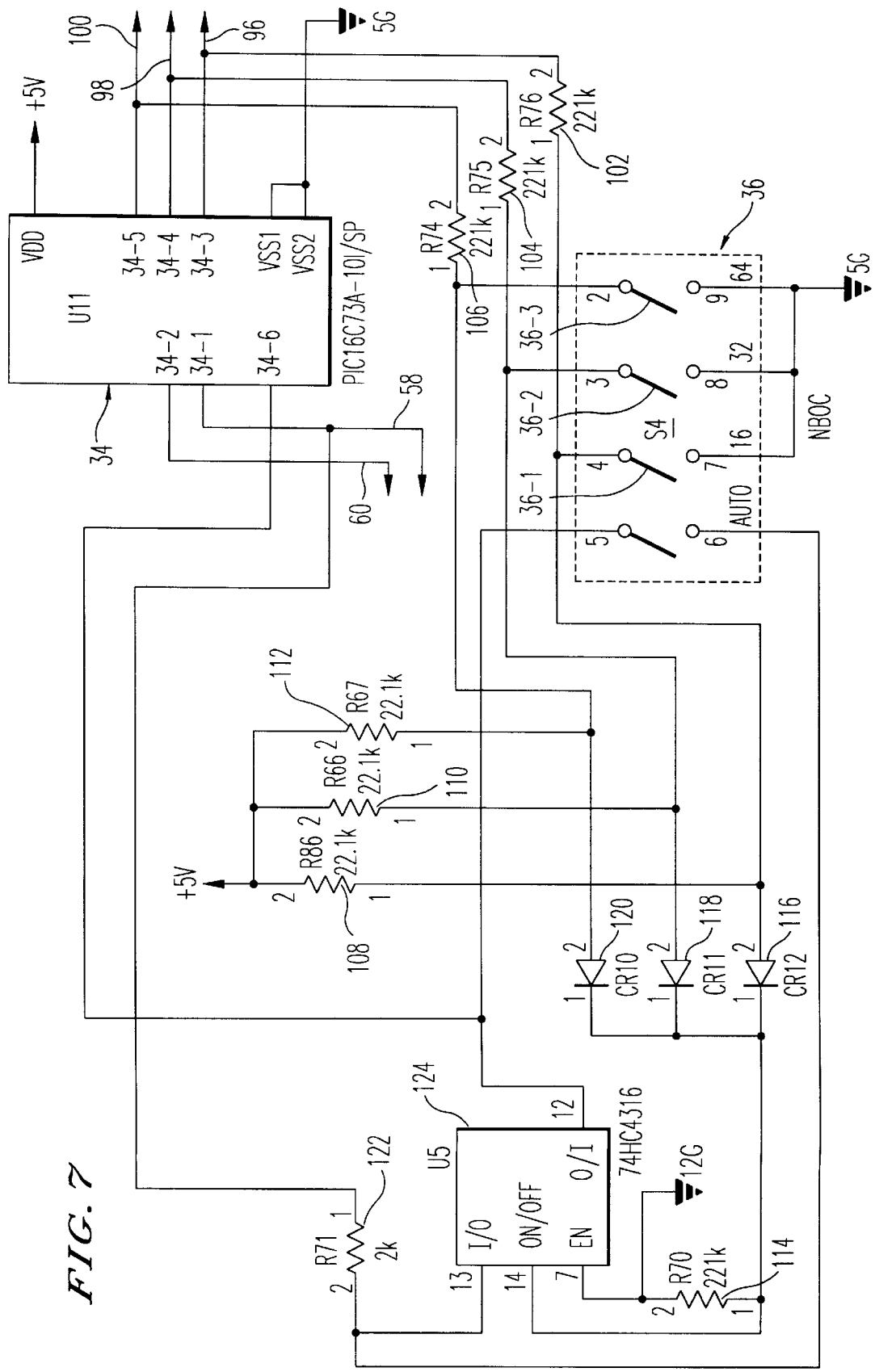
FIG. 7 is a circuit diagram showing the details of an exemplary connection of the option switches and microprocessor of the apparatus shown in FIG. 3.

The microprocessor 34 and option switches 36 are shown in more detail in FIG. 7. Specifically, the microprocessor 34 can be any type of microprocessor known in the art, and includes a terminal VDD that is coupled to a +5 volt power supply (not shown), and terminals VSS1 and VSS2 which are coupled to ground. The microprocessor 34 further includes terminals 34-1 and 34-2, which are coupled to lines 58 and 60, respectively, to receive the scaled voltage from the prescaler 42.

The microprocessor also includes terminals 34-3, 34-4 and 34-5, which are coupled to lines 96, 98 and 100, respectively, to control switches 90, 92 and 94, respectively, of switch 32. The terminals 34-3, 34-4 and 34-5 of microprocessor 34 are further coupled to terminals of switches 36-1, 36-2 and 36-3, respectively, of option switch 36 via resistors 102, 104 and 106, respectively.

The terminals of switches 36-1, 36-2 and 36-3, which are coupled to resistors 102, 104 and 106, respectively, are also coupled to a +5 volt power supply via resistors 108,110 and 112, respectively, and to ground via a resistor 114 and diodes 116, 118 and 120, respectively, as illustrated. The terminals of switches 36-1, 36-2 and 36-3 which are not coupled to resistors 102, 104 and 106, respectively, are coupled to ground.

Terminal 34-1 of microprocessor 34 is further coupled to a terminal of the "AUTO" switch of option switch 36 via resistor 122. The other terminal of the AUTO switch is coupled to terminal 34-6 of microprocessor 34, which is further coupled to an output/input port of an electronic switch circuit 124.

Figure 8:
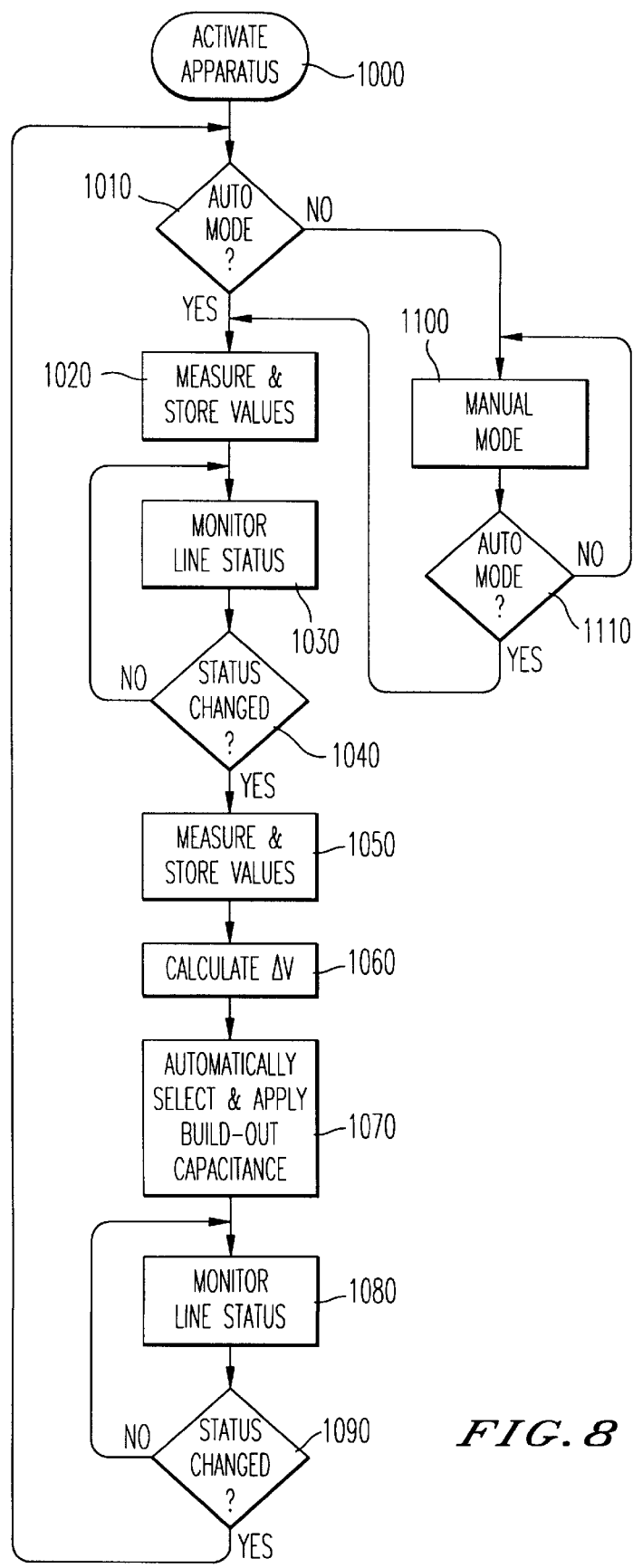
FIG. 8 is a flowchart depicting an example of the steps of operation performed by the apparatus shown in FIG. 3.

The operation of the apparatus 10 will now be described with respect to the flowchart shown in FIG. 8.

When the apparatus 10 is coupled to the tip line 16 and ring line 18 of POTS line and activated in step 1000, the microprocessor 34 will determine in step 1010 whether the AUTO switch of option switches 36 is set to the automatic mode (open) or manual mode (closed). It is noted that although the step of monitoring the status of the auto switch is depicted as step 1010, the microprocessor 34 continues to monitor the status of the AUTO switch throughout the operations discussed below. If at any time, the AUTO switch is set to the manual mode, the microprocessor will enter the manual mode operation as is described in further detail below. Further, if any combination of switches 36-1, 36-2, or 36-3 is selected (open), a logic high level is coupled via resistors 108, 110, or 112 to capacitors 116, 118, or 120, and then to control pin of electronic switch circuit 124. This causes a connection to be made between pins 13 and 12 of electronic switch circuit 124, which appears across the auto switch and thus simulates a closed auto switch, forcing non-auto operation (MANUAL) if one or more of 36-1, 36-2, 36-3 is selected.

The operation of the apparatus 10 in the automatic mode will now be discussed.

When the AUTO switch is set to the automatic position (i.e., the open position), as shown in FIG. 7, the terminals 34-1 and 34-6 of the microprocessor 34 will not be coupled to each other. The microprocessor will thus determine in step 1010 that the apparatus is operating in the "automatic" mode in which the microprocessor 34 will control the switch 32 to apply to the balance port 30 of the hybrid 12 an appropriate amount of build-out capacitance in the manner described below.

Specifically, the microprocessor 34 will receive the scaled voltage on lines 58 and 60, which is representative of the voltage on lines 16 and 18 as scaled by the prescaler 42. That is, as discussed above, the prescaler 42 will receive a voltage that appears on the tip line 16, which is typically within the range of about −50 volts to about 0 volts, and convert that voltage into a voltage within a range of about 0 to about +5 volts, which is output on line 58 that is coupled to terminal 34-1, of microprocessor 34. Also, the prescaler 42 will receive a voltage that appears between the tip line 16 and ring line 18, which can be in the range of about −200 volts to about +100 volts, and convert that voltage into a voltage within a range of 0 to about +5 volts, which is output on line 60 that is coupled to terminal 34-2 of microprocessor 34.

The microprocessor 34 is programmed to measure and store in a memory 39 (see FIG. 3) the value of the scaled voltage representative of the value of the voltage present on line 60. The microprocessor 34 is further programmed to determine, based on the value of the voltage of the signal present between lines 16 and 18, whether the lines 16 and 18 are in an on-hook state, in which no communication signal is present on those lines (e.g., when the phone or telecommunication device coupled to lines 16 and 18 is in the on-hook state), or in an off-hook state, in which a communication signal is present on those lines (e.g., when the phone or telecommunication device coupled to lines 16 and 18 is in an off-hook state). Since the value of the scaled present on line 60 is representative of the value of the voltage on lines 16 and 18, the microprocessor makes the on-hook and off-hook determinations based on the value of that scaled voltage.

Accordingly, in step 1020, when the microprocessor 34 determines that the lines 16 and 18 are in the on-hook state, the microprocessor 34 will store in memory the value of the voltage present between the tip and ring lines. The microprocessor 34 will then continue to monitor the status of the between the tip and ring lines in step 1030 (based on the value of the scaled voltage present between lines 58 and 60) to determine whether the line has changed status (i.e., went from an on-hook to off-hook state).

When the microprocessor 34 detects a change in the value of the voltage on the line, the microprocessor 34 will thus detect in step 1040 that the status of the line has changed (i.e., the line is in the off-hook state), and in step 1050, measure and store the new value of the voltage on the line. In step 1060, the microprocessor 34 can then calculate the difference between the measured on-hook and off-hook voltages (i.e., the DV), and access memory 39 in which values of build-out capacitance are stored in relation to values of DV to arrive at an appropriate amount of build-out capacitance to be applied to the hybrid. Those values of build-out capacitance stored in the memory 39 have been determined in the following manner.

The following equation represents the relationship between the on-hook and off-hook voltages and currents with respect to the line resistance:

$$[V\ on\text{-}hook] - [V\ off\text{-}hook] = [I\ on\text{-}hook - I\ off\text{-}hook] * [Line\ R + linecard\ R]$$

where V on-hook is the measured on-hook voltage, V off-hook is the measured off-hook voltage, I on-hook is the measured on-hook current (which is typically about 0 amps), I off-hook is the known off-hook current, linecard R is the resistance of the circuit card in the switch (not shown), which is about 440 ohms, and Line R is the resistance of the line being determined. The line resistance of the POTS line and the gauge of wire used as the POTS line influences the amount of capacitance that will appear at the interface between the POTS line and the apparatus 10. As stated above, the build-out capacitance is applied to the hybrid 12 to compensate for this interface capacitance and thus balance or substantially balance the hybrid 12. Accordingly, the appropriate amount of build-out capacitance to be applied is ascertained based on the line resistance and the gauge of the POTS line.

Figure 9:
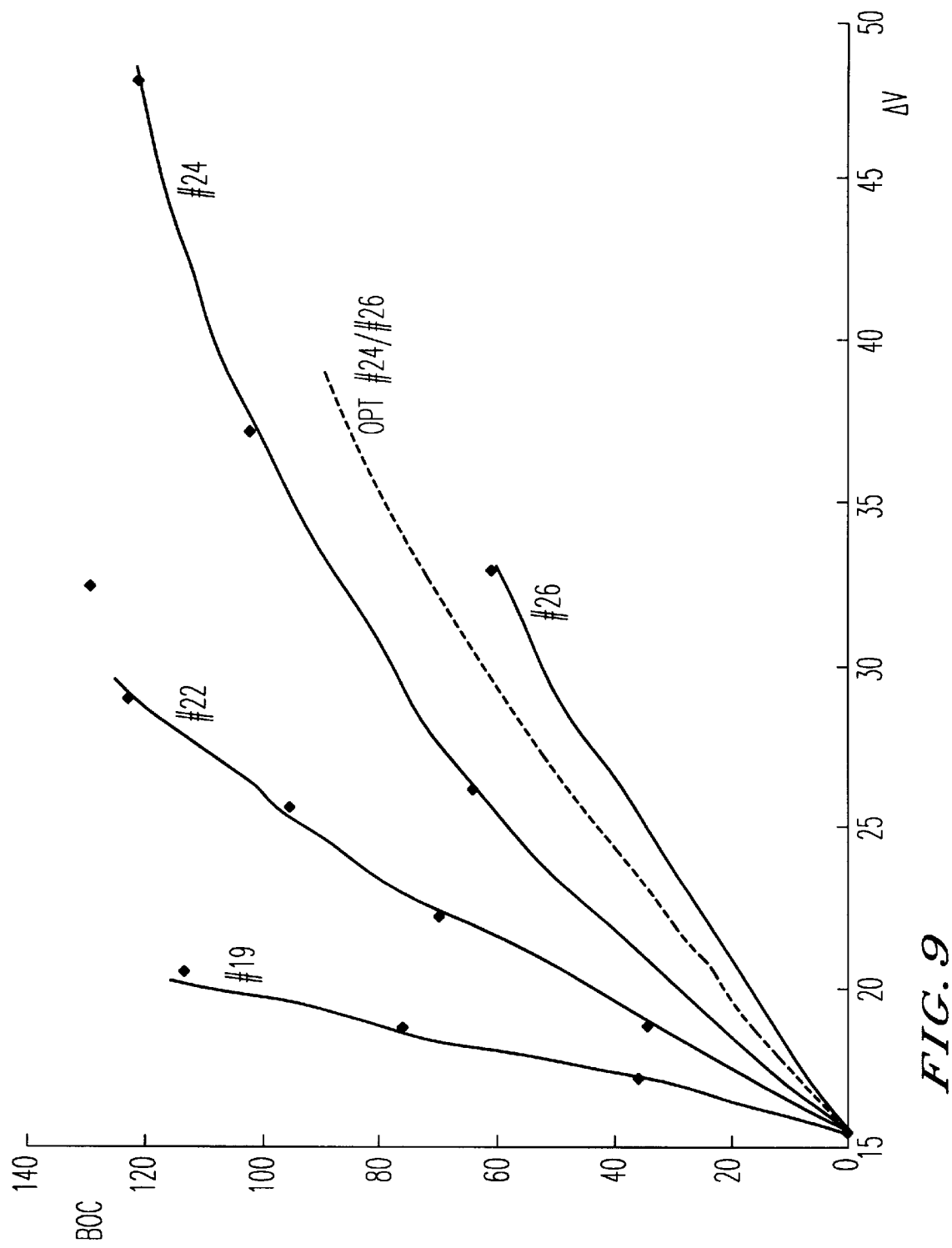
FIG. 9 is a graph illustrating an example of values of build-out capacitance to be applied to the 2–4 wire hybrid of the apparatus shown in FIG. 3 in relation to the gauge of transmission line coupled to the hybrid and the difference in the voltages measured on the transmission line during on-hook and off-hook conditions.

Because the value of the line resistance is calculated based on the difference between the measured on-hook and off-hook voltages on the POTS line (i.e., the DV) as indicated in the above equation, the optimum amount of build-out capacitance for a particular gauge line can be conveniently represented in relation to the difference in on-hook and off-hook line voltages (DV) as shown, for example, in FIG. 9. As also shown in this figure, the amount of build-out capacitance that should be applied to a hybrid that is coupled to a POTS line made of 19 gauge cable for the range of DV between 15 and 50 is different than the amount of build-out capacitance that should be applied when the hybrid is coupled to a 22, 24 or 26 gauge cable.

Furthermore, it is known that the most common cable gauges used in telephony voice circuits are 19, 22, 24 and 26 gauge. Additionally, it has been determined through experimentation that an average of the optimum build-out capacitances for each DV value for 24 and 26 gauge cables (as designated by the line labeled "opt #24/#26" in FIG. 9) can be used as the build-out capacitance values for the balance port of a hybrid coupled to 19, 22, 24 or 26 gauge cables without adversely affecting the trans-hybrid loss of the hybrid. That is, experimentation has shown that the trans-hybrid loss of a hybrid coupled to 19, 22, 24 or 26 gauge wire will not be worsened if the amount of build-out capacitance applied to the hybrid is selected based on the values defined by line "opt #24/#26" in FIG. 9. This is especially true when the hybrid is handling signals in the midband range of 500 Hz to 2500 Hz.

Accordingly, to simplify the operation of the apparatus 10, the memory 39 that the microprocessor 34 accesses is configured to store optimum build-out capacitance values as defined by line "opt #24/#26" in relation to corresponding changes in line voltages DV. The memory 39 can be configured to instead store build-out capacitance values in relation to the difference in on-hook and off-hook current (i.e., the DI), or in relation to line resistance, if so desired. Also, the buildout capacitance values need not be defined by line "opt #24/#26" in FIG. 9, but can be any other appropriate values which will not adversely affect the trans-hybrid loss of the hybrid for the common POTS line cable gauges of 19, 22, 24 or 26.

In addition, as explained above, the build-out capacitance to be applied by the desired combination of capacitive elements C1–C3 is intended to increase or maximize the amount of trans-hybrid loss that will be present in the hybrid 12, thereby isolating or substantially isolating transmit line 22 from receive line 26 so that no or substantially no crosstalk will occur between those lines. Because this embodiment includes only 3 capacitive elements C1–C3, only 8 different amounts of build-out capacitance can be applied (i.e., 8 different combinations of C1–C3 can selected). However, it has been determined by experimentation that the possible values of build-out capacitance as provided by the 8 different combinations of capacitive elements C1–C3 will be sufficient, as a practical matter, to achieve this result.

Therefore, the memory 39 is arranged such that the capacitance values are grouped into 8 groups, each corresponding to one of the values that could be applied to the balance port 30 of the hybrid 12 by a combination of capacitive elements C1–C3. In particular, each of the 8 capacitance values corresponds to a certain range of values for DV. Hence, the memory 39 includes a "look-up" table which associates each of 8 three-bit binary strings, representing the 8 combinations of capacitive elements C1–C3, with a respective range of values for DV. The apparatus 10 and, in particular, the operation of the memory 39 and microprocessor 34 can be modified to accommodate any amount of capacitive elements and corresponding switches as would be appreciated by one skilled in the art.

Turning back to the operation of the microprocessor 34, in step 1070, the microprocessor 34 reads from memory 39 a three-bit binary string representing the build-out capacitance value corresponding to the change in voltage DV, and outputs the signals, represented by the three-bit binary string, on terminals 34-3 through 34-5 to control switches 90, 92 and 94 of switch 32, as appropriate, to apply a desired combination of the capacitances of capacitive elements C1–C3 to the balance port 30 of the hybrid 12. That is, the microprocessor 34 will output a signal at one or more of ports 34-3, 34-4 and 34-5, which will control switches 90, 92 and 94, as appropriate, to couple the desired combination of capacitive elements C1–C3 to ground.

For example, if the microprocessor 34 reads from the memory the three-bit binary string indicating that the value of build-out capacitance to be applied to the balance port 30 should be that which would be provided by capacitive element C1 (e.g., binary string "001"), the microprocessor will provide an appropriate output signal (e.g., a +5 volt DC signal) at terminal 34-3 and appropriate output signals (e.g., a 0 volt signal) at terminals 34-4 and 34-5. The signal at terminal 34-3 will appear on line 96 and control switch 90 to close, thereby coupling capacitance element C1 to ground. The capacitance element C1 will thus be applied to balance port 30. However, the 0 volt signals appearing at terminals 34-4 and 34-5 will appear on lines 98 and 100, respectively, and maintain switches 92 and 94 in their open state. Hence, capacitive elements C2 and C3 will not be applied to the balance port 30.

If, on the other hand, the microprocessor 34 reads from memory the three-bit binary string indicating that the amount of capacitance that should be applied as the build-out capacitance is that which is provided by capacitive elements C1 and C3 (e.g., binary string "101"), the microprocessor will provide the appropriate output signals (e.g., +5 volts) at ports 34-3 and 34-5, which will be provided over lines 96 and 100, respectively, to switches 90 and 94. The microprocessor will also provide the appropriate output signal (e.g., 0 volts) at port 34-4, which will be provided over line 98 to switch 92. The signals on lines 96 and 100 will control switches 90 and 94 to couple capacitive elements C1 and C3, respectively, to ground, while the signal on line 98 will keep switch 92 in the open state. Hence, the combined capacitance provided by capacitive elements C1 and C3 connected in parallel will be applied to the balance port 30 of the hybrid 12.

Again, it is noted that the microprocessor 34 can control switch 32 to apply any combination of capacitive elements C1, C2 and C3 to the balance port 30. Furthermore, as stated above, the apparatus 10 can be modified to include any number of capacitive elements, and the microprocessor 34 and memory 39 can be modified accordingly so that any combination of those capacitive elements can be applied to the balance port 30 as desired based on the determined change in voltage DV.

In step 1080, the microprocessor 34 will continue to monitor the line status (i.e., whether the line has gone from an off-hook condition back to the on-hook condition). If the microprocessor 34 determines in step 1090 that the status of the line has not changed, the microprocessor 34 will continue to monitor the line status as indicated. However, if the microprocessor 34 determines in step 1090 that the status of the line has changed (i.e., the line has returned to the on-hook condition), the processing will return to step 1010 and the above steps will be repeated.

The operation of the apparatus in the manual mode will now be described.

If in step 1010, for example, the microprocessor 34 determines that the AUTO switch is set to the manual position, or that any one of the switches 36-1 through 36-3 are selected, the microprocessor 34 will enter the manual mode of operation in step 1100 to allow manual selection of any combination of capacitive elements C1–C3 to be applied to the balance port. Specifically, when the AUTO switch of option switch 36 is switched to the manual position (i.e., the AUTO switch is closed), the AUTO switch will couple terminals 34-1 and 34-6 of the microprocessor 34 together. This will cause the microprocessor 34 to assume a tri-state output at terminals 34-3, 34-4 and 34-5. In this event, the switches 36-1, 36-2 and 36-3 will control the values of the signals that appear on lines 96, 98 and 100, respectively.

For example, if switch 36-1 is in an open position, a voltage will be generated on line 96 as a result of the connection from line 96 to the +5 volt power supply via resistors 102 and 108. This signal will control switch 90 of switch 32 to couple the capacitive element C1 to ground, thereby applying the capacitive element C1 via line 80 to the balance port 30 of hybrid 12.

However, when switch 36-1 is closed, line 96 will essentially be grounded through resistor 102 and therefore, a low value will appear on line 96. Accordingly, switch 90 will remain open and therefore, capacitive element C1 will not be applied to the balance port 30.

Switches 36-2 and 36-3 control switches 92 and 94, respectively, of switch 32 in a similar manner. That is, when switch 36-2 is open, a voltage will appear on line 98 as a result of the connection from line 98 to the +5 volt power supply via resistors 104 and 110. Likewise, when switch 36-3 is open, a voltage will be generated on line 100 by the connection to the 5 volt power supply via resistors 106 and 112. When these high signals appear on lines 98 and 100, switches 92 and 94, respectively, couple capacitive elements C2 and C3 to ground and thus, apply those capacitive elements in parallel to the balance port 30 via line 80.

However, when switch 36-2 is closed, line 98 will be essentially coupled to ground and thus, a low signal will appear on line 98. Similarly, when switch 36-3 is closed, line 100 will essentially be at ground and therefore, a low signal will appear on line 100. When these low signals appear on lines 98 and 100, the switches 92 and 94 remain open and thus, the capacitive elements C2 and C3 are not coupled to ground and not applied to the balance port 30. As with the automatic control by the microprocessor 34, switches 36-1, 36-2 and 36-3 can be used to apply any combination of capacitive elements C1, C2 and C3 to the balance port 30 to thus provide the desired build out capacitance to that port.

During the manual mode of operation, the microprocessor 34 will continue to monitor the status of the AUTO switch as indicated in step 1110. If, at any time, the AUTO switch is changed to the automatic setting, the microprocessor 34 will enter the automatic mode beginning at step 1020, and processing will continue as described above with regard to steps 1020 through 1090. Of course, as described above, if at any time during that processing, the microprocessor detects that the AUTO switch has been changed to the manual mode, the microprocessor 34 will control the apparatus 10 to enter the manual mode of operation as described above with regard to step 1110.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An apparatus for determining a value of a capacitance to be coupled to a telecommunication circuit, comprising:

a determining device, adaptable to determine a value of a parameter relating to a transmission line to which the telecommunication circuit is adaptable to be coupled; and a designating devices adaptable to be selectably operable in a designating mode to designate, based on the determined value of the parameter, any number of a plurality of capacitive elements to be coupled to the telecommunication circuit, the number ranging from zero to the entire plurality of capacitive elements.

2. An apparatus as claimed in claim 1, further comprising a coupling devices adaptable to be selectably controlled by the designating device to couple to the telecommunication circuit the designated capacitive elements.

3. An apparatus as claimed in claim 2, wherein the coupling device comprises a plurality of switches, each coupled to a respective one of the capacitive elements, and each being selectably controlled by the designating device to couple its respective capacitive element to the telecommunication circuit when that respective capacitive element is designated by the designating device.

4. An apparatus as claimed in claim 1, wherein the determining device is adaptable to measure voltages present on the transmission line at different times, and determines the parameter relating to the transmission line based on the measured voltages.

5. An apparatus as claimed in claim 4, wherein the determining device determines the parameter based on a difference in values of the measured voltages.

6. An apparatus as claimed in claim 1, wherein one of the following conditions are met:

each of the plurality of capacitive elements has a capacitance value different than that of any other of the capacitive elements; and at least two of the capacitive elements have substantially the same capacitance value.

7. An apparatus as claimed in claim 1, the designating device is adaptable to read from a memory a designator corresponding to the determined value of the parameter, and designates said any number of the plurality of capacitive elements to be coupled to the telecommunication circuit based on the designator.

8. An apparatus as claimed in claim 1, wherein the designating device is further selectably operable in a non-designating mode, and wherein the apparatus further comprises a second designating device, adaptable to selectably control the designating device to operate in the non-designating mode such that the second designating device designates said any number of the plurality of capacitive elements to be coupled to the telecommunication circuit.

9. An apparatus as claimed in claim 8, further comprising a coupling device, adaptable to be controlled by the designating device to couple to the telecommunication circuit the capacitive elements designated by the designating device when the designating device is operating in the designating mode, and adaptable to be controlled by the second designating device to couple to the telecommunication circuit the capacitive elements designated by the second designating device when the designating device is operating in the non-designating mode.

10. An apparatus as claimed in claim 9, wherein the coupling device comprises a plurality of switches, each coupled to a respective one of the capacitive elements;

each of the switches being controlled by the designating device to couple its respective capacitive element to the telecommunication circuit when that respective capacitive element is designated by the designating device operating in the designating mode; and each of the switches being controlled by the second designating device to couple its respective capacitive element to the telecommunication circuit when that respective capacitive element is designated by the second designating device when the designating device is operating in the non-designating mode.

11. An apparatus as claimed in claim 8, wherein the designating device automatically designates said any number of capacitive elements and said second designating device is adaptable to be manually controlled to designate said any number of capacitive elements.

12. An apparatus for determining a value of a capacitance to be coupled to a balance port of a hybrid, adaptable to be disposed in a telecommunication circuit, comprising:

a determining device, adaptable to determine a value of a parameter relating to a transmission line to which the hybrid is adaptable to be coupled; and a designating device, adaptable to be selectably operable in a designating mode to designate, based on the determined value of the parameter, any number of a plurality of capacitive elements to be coupled to the balance port of the hybrid, the number ranging from zero to the entire plurality of capacitive elements.

13. An apparatus as claimed in claim 12, further comprising a coupling device, adaptable to be selectably controlled by the designating device to couple to the balance port of the hybrid the designated capacitive elements.

14. An apparatus as claimed in claim 13, wherein the coupling device comprises a plurality of switches, each coupled to a respective one of the capacitive elements, and each being selectably controlled by the designating device to couple its respective capacitive element to the balance port of the hybrid when that respective capacitive element is designated by the designating device.

15. An apparatus as claimed in claim 12, wherein the determining device is adaptable to measure voltages present on the transmission line at different times, and determines the parameter relating to the transmission line based on the measured voltages.

16. An apparatus as claimed in claim 15, wherein the determining device determines the parameter based on a difference in values of the measured voltages.

17. An apparatus as claimed in claim 12, wherein one of the following conditions are met:

each of the plurality of capacitive elements has a capacitance value different than that of any other of the capacitive elements;

at least two of the capacitive elements have substantially the same capacitance value.

18. An apparatus as claimed in claim 12, wherein the designating device is adaptable to read from a memory a designator corresponding to the determined value of the parameter, and designates said any number of the plurality of capacitive elements to be coupled to the hybrid based on the designator.

19. An apparatus as claimed in claim 12, wherein the designating device is further selectably operable in a non-designating mode, and wherein the apparatus further comprises a second designating device, adaptable to selectably control the designating device to operate in the non-designating mode such that the second designating device designates said any number of the plurality of capacitive elements to be coupled to the balance port of the hybrid.

20. An apparatus as claimed in claim 19, further comprising a coupling device, adaptable to be controlled by the designating device to couple to the balance port of the hybrid the capacitive elements designated by the designating device when the designating device is operating in the designating mode, and adaptable to be controlled by the second designating device to couple to the balance port of the hybrid the capacitive elements designated by the second designating device when the designating device is operating in the non-designating mode.

21. An apparatus as claimed in claim 20, wherein the coupling device comprises a plurality of switches, each coupled to a respective one of the capacitive elements;

each of the switches being controlled by the designating device to couple its respective capacitive element to the balance port of the hybrid when that respective capacitive element is designated by the designating device operating in the designating mode; and each of the switches being controlled by the second designating device to couple its respective capacitive element to the balance port of the hybrid when that respective capacitive element is designated by the second designating device when the designating device is operating in the non-designating mode.

22. An apparatus as claimed in claim 19, wherein the designating device automatically designates said any number of capacitive elements and said second designating device is adaptable to be manually controlled to designate said any number of capacitive elements.

23. A method for determining a value of a capacitance to be coupled to a telecommunication circuit, comprising the steps of:

determining a value of a parameter relating to a transmission line to which the telecommunication circuit is adaptable to be coupled; and selectably controlling a designating device to operate in a designating mode in which the designating device designates, based on the determined value of the parameter, any number of a plurality of capacitive elements to be coupled to the telecommunication circuit, the number ranging from zero to the entire plurality of capacitive elements.

24. A method as claimed in claim 23, further comprising the step of coupling to the telecommunication circuit the designated number of its capacitive elements.

25. A method as claimed in claim 23, wherein the determining step comprises the steps of:

measuring voltages present on the transmission line at different times; and determining the parameter of the transmission line based on the measured voltages.

26. A method as claimed in claim 25, wherein the parameter determining step comprises the steps of:

determining a difference in the values of the measured voltages; and determining the parameter based on the difference.

27. A method as claimed in claim 23, wherein the selectably controlling step comprises the step of:

controlling the designating device to read from a memory a designator corresponding to the determined value of the parameter; and controlling the designating device to designate said any number of the plurality of capacitive elements to be coupled to the hybrid based on the designator.

28. A method as claimed in claim 23, further comprising the steps of:

selectably controlling the designating device to operate in a non-designating mode in which the designating device does not designate said any number of capacitive elements; and controlling a second designating device to designate, independent of the determined value of the parameter, said any number of the plurality of capacitive elements to be coupled to the telecommunication circuit.

29. A method as claimed in claim 28, further comprising the steps of:

when the designating device is operating in the designating mode, couplig to the telecommunication circuit the capacitive elements designated by the designating device; and when the designating device is operating in the non-designating mode, coupling to the telecommunication circuit the capacitive elements designated by the second designating device.

30. A method as claimed in claim 28, wherein the designating device automatically designates said any number of capacitive elements and said second designating device is adaptable to be manually controlled to designate said any number of capacitive elements.

31. A method for determining a value of a capacitance to be coupled to a balance port of a hybrid, adaptable to be disposed in a telecommunication circuit, comprising the steps of:

determining a value of a parameter of a transmission line to which the hybrid is adaptable to be coupled; and selectably controlling a designating device to operate in a designating mode in which the designating device designates, based on the determined value of the parameter, any number of a plurality of capacitive elements to be coupled to the balance port of the hybrid, the number ranging from zero to the entire plurality of capacitive elements.

32. A method as claimed in claim 31, further comprising the step of coupling to the balance port of the hybrid the designated capacitive elements.

33. A method as claimed in claim 31, wherein the determining step comprises the steps of:

measuring voltages present on the transmission line at different times; and determining the parameter of the transmission line based on the measured voltages.

34. A method as claimed in claim 33, wherein the parameter determining step comprises the steps of:

determining a difference in the values of the measured voltages; and determining the parameter based on the difference.

35. A method as claimed in claim 31, wherein the selectably controlling step comprises the steps of:

controlling the designating device to read from a memory a designator corresponding to the determined value of the parameter; and controlling the designating device to designate said any number of the plurality of capacitive elements to be coupled to the hybrid based on the designator.

36. A method as claimed in claim 31, further comprising the steps of:

controlling the designating device to operate in a non-designating mode in which the designating device refrains from designating said any number of capacitive elements; and controlling a second designating device to designate, independent of the determined value of the parameter, said any number of the plurality of capacitive elements to be coupled to the balance port of the hybrid.

37. A method as claimed in claim 36, further comprising the steps of:

when the designating device is operating in the designating mode, coupling to the balance port of the hybrid the capacitive elements designated by the designating device; and when the designating device is operating in the non-designating mode, coupling to the balance port of the hybrid the capacitive elements designated by the second designating device.

38. A method as claimed in claim 36, wherein the designating device automatically designates said any number of capacitive elements and said second designating device is adaptable to be manually controlled to designate said any number of capacitive elements.

* * * * *